US011099723B2

(12) United States Patent
Johansson

(10) Patent No.: US 11,099,723 B2
(45) Date of Patent: Aug. 24, 2021

(54) INTERACTION METHOD FOR USER INTERFACES

(71) Applicant: Huawei Technologies Co., Ltd., Guangdong (CN)

(72) Inventor: Panu Johansson, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 15/475,652

(22) Filed: Mar. 31, 2017

(65) Prior Publication Data

US 2017/0205995 A1 Jul. 20, 2017

Related U.S. Application Data

(63) Continuation of application No. PCT/CN2015/079807, filed on May 26, 2015.

(30) Foreign Application Priority Data

Oct. 2, 2014 (EP) .................................... 14187509

(51) Int. Cl.
*G06F 3/0481* (2013.01)
*G06F 3/0484* (2013.01)
(Continued)

(52) U.S. Cl.
CPC ........ *G06F 3/04845* (2013.01); *G06F 3/0481* (2013.01); *G06F 3/04815* (2013.01);
(Continued)

(58) Field of Classification Search
CPC .......................... G06F 3/04845; G06F 3/0481
See application file for complete search history.

(56) References Cited

U.S. PATENT DOCUMENTS 5,745,109 A 4/1998 Nakano et al.
2002/0042853 A1 4/2002 Santoh et al.
(Continued)

FOREIGN PATENT DOCUMENTS

CN 1346101 A 4/2002
CN 1894860 A 1/2007
(Continued)

OTHER PUBLICATIONS

D. Brookshire et al., "Three-Dimensional Widgets", Association for Computing Machinery, 1992, 8 pages.
(Continued)

*Primary Examiner* — Beau D Spratt
(74) *Attorney, Agent, or Firm* — Maier & Maier, PLLC

(57) ABSTRACT

An apparatus comprising a display configured to provide a user interface and a processor is provided, wherein the processor is configured to provide at least a first interactive element in a foreground of the user interface, provide at least a second interactive element, the second interactive element being arranged in a background of the user interface, receive an indication of an interaction of a user with the second interactive element in the background and trigger a function determined by the second interactive element based on the indication of the interaction with the second interactive element. Furthermore, a method for operating a user interface is defined.

10 Claims, 5 Drawing Sheets

(51) Int. Cl.
*G06F 3/16* (2006.01)
*G06F 3/0488* (2013.01)

(52) U.S. Cl.
CPC ............ *G06F 3/167* (2013.01); *G06F 3/0488* (2013.01); *G06F 2203/0381* (2013.01); *G06F 2203/04104* (2013.01); *G06F 2203/04802* (2013.01)

(56) References Cited

U.S. PATENT DOCUMENTS

| | | | |
|---|---|---|---|
| 2004/0100479 A1* | 5/2004 | Nakano | G06F 3/0362 715/700 |
| 2005/0054393 A1 | 3/2005 | Fagerstrom et al. | |
| 2005/0057497 A1 | 3/2005 | Kawahara | |
| 2006/0212829 A1* | 9/2006 | Yahiro | G06F 3/0482 715/810 |
| 2006/0284852 A1 | 12/2006 | Hofmeister et al. | |
| 2009/0019401 A1* | 1/2009 | Park | G06F 3/04883 715/841 |
| 2011/0096006 A1* | 4/2011 | Jeong | G06F 3/0488 345/173 |
| 2012/0124475 A1* | 5/2012 | Foote | H04N 21/812 715/719 |
| 2012/0249475 A1 | 10/2012 | Murphy et al. | |
| 2012/0249545 A1 | 10/2012 | Kim | |
| 2013/0113737 A1 | 5/2013 | Shiba | |
| 2013/0198634 A1* | 8/2013 | Matas | G06F 3/04845 715/717 |
| 2013/0297319 A1* | 11/2013 | Kim | G10L 15/22 704/275 |
| 2014/0137020 A1* | 5/2014 | Sharma | G06F 3/0482 715/769 |
| 2014/0215336 A1* | 7/2014 | Gardenfors | G06F 3/017 715/719 |
| 2015/0074606 A1* | 3/2015 | Melen | G06F 3/04817 715/835 |
| 2015/0091818 A1* | 4/2015 | Kim | H04N 13/167 345/173 |
| 2017/0153716 A1 | 6/2017 | Miyazawa et al. | |

FOREIGN PATENT DOCUMENTS

| | | |
|---|---|---|
| CN | 101500328 A | 8/2009 |
| CN | 103092505 A | 5/2013 |
| EP | 2767898 A2 | 8/2014 |
| JP | 2006-260267 A | 9/2006 |
| JP | 2012-058900 A | 3/2012 |
| JP | 2013101465 A | 5/2013 |
| KR | 100966848 B1 | 6/2010 |
| KR | 20120026145 A | 3/2012 |
| WO | 97/41505 A1 | 11/1997 |

OTHER PUBLICATIONS

Doug A. Bowman et al., "New Directions in 3D User Interfaces", 30 pages.

* cited by examiner

INTERACTION METHOD FOR USER INTERFACES

CROSS-REFERENCE TO RELATED APPLICATIONS

This application is a continuation of International Application No. PCT/CN2015/079807, filed on May 26, 2015, which claims priority to European Patent Application No. EP14187509.6, filed on Oct. 2, 2014. The disclosures of the aforementioned applications are hereby incorporated by reference in their entireties.

TECHNICAL FIELD

The disclosure generally relates to user interaction and, more particularly, to an interaction method for and an apparatus enabling interaction with a user interface.

BACKGROUND

Current graphical user interfaces (UI) typically allow users to interact with electronic devices through direct manipulation of individual graphical icons and visual indicators arranged on a flat plane following a two-dimensional metaphor. Three-dimensional (3D) user interfaces represent similar graphical icons and visual indicators in three dimensions. However, users typically continue to operate on a flat plane.

Based on a particular set-up of a graphical user interface, a user may provide input directed at an individual graphical icon or visual indicator in order to execute functionality represented by the graphical icon or visual indicator. For example, a user may directly manipulate a graphical icon on a screen by touching or clicking the graphical icon or utilizing gestures associated with the graphical icon. For example, the user may utilize a pointing device to click or otherwise select a graphical icon or visual indicator, or a touch-sensitive device to directly touch the graphical icon or visual indicator.

Graphical user interfaces are typically limited in size. Hence, the number of elements and corresponding functionality exposed by the user interface is limited. Even though 3D user interfaces may exploit an enlarged interactive space, the interaction is still based on the idea of interacting on a flat (two-dimensional) plane and interactions are typically only related to an active part or a context of the user interface. Remaining parts of the user interface cannot be directly operated by the user.

SUMMARY

In view of the above it is an object of the present invention to improve interaction with user interfaces and, in particular, to extend the functionality provided by user interfaces. The foregoing and other objects are achieved by the features of the independent claims. Further implementation foils are apparent from the dependent claims, the description and the Figures.

According to a first aspect, an apparatus is provided which comprises a display configured to provide a user interface. The apparatus further comprises a processor configured to provide at least a first interactive element in a foreground of the user interface, provide at least a second interactive element, the second interactive element being arranged in a background of the user interface, receive an indication of an interaction of a user with the second interactive element in the background, and trigger a function determined by the second interactive element based on the indication of the interaction with the second interactive element.

It is to be understood, that even though aspects and implementations according to the present disclosure may refer to graphical user interfaces and visual representations of interactive elements of the user interfaces, the user interface is not restricted to a visual representation of interactive elements only and may in addition or as an alternative define interactive elements represented in different modalities in any combination, such as based on an acoustic or somatosensory representation of interactive elements. For example, the user interface may include a graphical representation of interactive elements, which can be enhanced by a haptic sensation using force or vibrotactile feedback of the same or other interactive elements in order to enhance the information presented to a user operating the user interface.

Interactive elements of the user interface, such as the first and second interactive elements, may be any kind of functional component of the user interface, which can be represented on the user interface and which may allow users to trigger certain functionality associated with the interactive element. Interactive elements may, for example, be one or more of icons, buttons or other graphical objects, sounds or other acoustic objects, and objects represented by forces, vibrations or motions or other tactile objects.

Users may interact with the interactive elements by providing respective user input that may be used to identify an affected interactive element within the user interface. Based on the user input and the affected interactive element, the processor may generate an indication of interaction and may provide the information to the user interface or an underlying processing component or engine. Typically, only those interactive elements which are provided in the foreground of the user interface may be active, such that any interaction of the user may be directed to interactive elements of the foreground. However, interaction of the user with interactive elements in the background of the user interface, such as the second interactive element, may also be processed in order to generate a respective indication of the interaction of the user with the interactive elements in the background and in order to trigger the function determined by the interactive element in the background. This extends the functionality of the user interface, since not only the active interactive elements in the foreground of the user interface but also the inactive interactive elements in the background of the user interface are affected by interaction of the user. Hence, the available functionality is further extended by the interactive elements in the background.

Preferably, the user interface may be a three-dimensional user interface. The interactive elements of any modality represented by the user interface can be represented in a realistic manner linked to a spatial environment, such as by visualizing interactive element as three-dimensional object, rendering sounds representing interactive elements in space, for example, using 3D acoustics, and providing localized tactile or haptic feedback.

As used throughout this description, the team "or" is understood as an inclusive conjunction or alternation, unless otherwise stated. Hence, the expression "A or B" means either A or B, or A and B, which can also be denoted as "A and/or B".

In a first possible implementation of the apparatus according to the first aspect, the function is triggered in response to a completion of the interaction with the second interactive element. The interaction may be defined by any kind of user input, which may include one or more actions performed or initiated by the user, such as hovering over or dragging the second interactive element or performing a respective gesture related to the second interactive element. The interaction may be concluded by finalizing the one or more actions, such as by clicking on the second interactive element, dropping the second interactive element or completing the gesture, in order to complete the interaction and trigger the respective function. This has the advantage that an interaction with the second interactive element can be initiated and the user may be provided with additional time to determine whether the initial user input was correctly linked to the intended interactive element. If the user determines that the affected interactive element is incorrect, he or she may interrupt or discontinue the interaction and initiate a new interaction directed at the intended interactive element.

In a second possible implementation of the apparatus according to the first aspect, the foreground of the user interface is an active context of the user interface and the background of the user interface defines a further context of the user interface. The user interface may comprise a plurality of interactive elements, such as the first interactive element and the second interactive element, that may be arranged in the foreground or in the background of the user interface or at least partially in the foreground and at least partially in the background of the user interface. The foreground of the user interface defines the active context or user space of the user interface, which includes those interactive elements the user can directly interact with. Hence, the foreground of the user interface may also be referred to as a front of the user interface. The user interface may comprise further hierarchies of information in one or more contexts or user spaces, each including interactive elements that may be initially in an inactive state, even though the user may interact with them. The further contexts or user spaces may be referred to as the background of the user interface. Accordingly, interactive elements in the background of the user interface may be perceivable in order to provide further information related to the functionality of the user interface. However, interactive elements in the background of the user interface may also be overlaid by interactive elements of the foreground and may therefore not be perceivable or may be only partially perceivable on the user interface. This has the advantage that the information and interactivity represented by the user interface can be provided on multiple hierarchies, such that a maximum of information is provided within the user interface without compromising intuitive usability of the user interface.

In a third possible implementation of the apparatus according to the first aspect, the first interactive element remains at least partially in the foreground and the second interactive element remains at least partially in the background during said interaction of the user with the second interactive element. The second interactive element can be interacted with even though the second interactive element at least partially or entirely remains in the background and even though the first interactive element remains at least partially or entirely in the foreground. This has the advantage that a switch of context to the second interactive element of the user interface can be at least partially avoided and the functionality provided by the first interactive element may still be available for further interactions.

In a fourth possible implementation of the apparatus according to the first aspect, the first interactive element is responsive to a first interaction with the first interactive element and the second interactive element is responsive to a second interaction with the second interactive element performed simultaneously with the first interaction. The processor may be configured to receive a first indication of the first interaction of the user with the first interactive element in the foreground and receive a second indication of the second interaction of the user with the second interactive element in the background. The second indication of the second interaction may correspond to the indication of the interaction of the user with the second interactive element triggering the function. The processor may determine whether at least parts of the first and second interactions are performed simultaneously. For example, the user may initiate the first interaction with the first interactive element and before completion of the first interaction may initiate the second interaction with the second interactive element. Likewise, the first and second interactions may be initiated substantially at the same time or only within a delay, which can be predefined based on the type and set-up of the user interface. Simultaneous interactions can be initiated, for example, by using different input devices, using multiple fingers on a touch-sensitive display or using multiple modalities, such as pointing at or touching the first interactive element and entering a voice command directed at the second interactive element.

In a fifth possible implementation of the apparatus according to the first aspect, the first interactive element in the foreground includes a handle. The handle may be a part of the interactive element, such as a dedicated area or an additional nested interactive element, and may be linked to a general functionality of the user interface, such as activation or deactivation of individual interactive elements, or change of focus or context of one or more interactive elements of the user interface. This has the advantage that the interactive elements may be provided with general functionality of the user interface without affecting the functionality originally defined by the interactive elements. In particular, an already configured user interface may be easily extended with the general functionality using respective handles.

In a sixth possible implementation of the apparatus according to the first aspect, the processor is configured to move or rotate the first interactive element at least partially out of the foreground in response to an interaction of the user with the handle, such that the second interactive element becomes at least partially perceivable. This has the advantage that in an initial set-up of the user interface, the first interactive element can entirely or at least partially overlay the second interactive element and can be manipulated using the handle in order to expose further details of the second interactive element.

In a seventh possible implementation of the apparatus according to the first aspect, the processor is further configured to activate the second interactive element in response to an interaction of the user with the handle. Accordingly, the interaction of the user with the handle may correspond to the first interaction with the first interactive element according to possible implementation forms, which may activate the second interactive element in the background. This has the advantage that the processing of user input directed at the user interface can be handled more efficiently, since activated interactive elements in the background can be prioritized during determination of a focus of user input on available interactive elements in the foreground, in the background or in other contexts of the user interface. Preferably, the processor may receive any user input and utilize the received user input to determine one or more of affected interactive elements. The processor may first consider interactive elements of the foreground and may evaluate interactive elements of the background or another context of the user interface if no interactive element of the foreground is affected by the user input. By activating the second interactive element in the background, the processor may already consider the second interactive element of the background together with the interactive elements in the foreground or may check the activated second interactive element prior to any other interactive elements of the background or any other context of the user interface.

In an eighth possible implementation of the apparatus according to the first aspect, the first interactive element is arranged on a first surface of a geometric object in the foreground of the user interface and the second interactive element is arranged on a second surface of the geometric object in the background. The geometric object may be a meta-object of the user interface. Further to the geometric object, the user interface may include further meta-objects or geometric objects representing interactive elements. The surfaces of the geometric object or parts of the meta-object may be used to represent one or more interactive elements. Preferably, the first surface and the second surface are adjacent surfaces of the geometric object. At least one of the surfaces may define the foreground of the user interface and the other surfaces, which may be at least partially not perceivable, may define the background of the user interface. This has the advantage that the interactive elements can be clearly arranged on the meta-objects within the user interface thereby improving clarity and usability of the user interface.

In a ninth possible implementation of the apparatus according to the first aspect, the processor is further configured to rotate the geometric object responsive to an interaction of the user with the first surface such that the second surface becomes at least partially perceivable. Preferably, the processor may be configured to rotate the geometric object in response to an interaction of the user with a handle of the first interactive element on the first surface according to an implementation form. This provides a more intuitive user interface, since the user may interact with the handle and, for example, swipe or drag the handle in order to rotate the geometric object in a way which would be expected in the real world. The second surface may become at least partially perceivable, for example, by visualizing the second surface including the second interactive element after or during the rotation. Additionally, or as an alternative, the second surface may also become perceivable in a different modality. For example, by rotating the geometric object, the second interactive element on the second surface may be acoustically or haptically rendered to the user.

In a tenth possible implementation of the apparatus according to the first aspect, the apparatus further comprises an acoustic sensor configured to detect a voice command representing the interaction with the second interactive element.

This enables a multi-modal display, wherein the user can interact with a graphical representation of the user interface and may further provide voice commands. The user may interact with the first interactive element, thereby preferably activating the second interactive element in the background, and may provide a voice command, which may represent the interaction with the second interactive element, such as the second interaction according to an implementation form.

Preferably, the apparatus may further comprise one or more input sensors configured to detect interaction of the user with the apparatus or with the user interface, in any other modality such as a touch sensor, which may, together with the display, form a touch-sensitive display of the apparatus. Preferably, the second interaction may be at least one of a voice command indicating the second interactive element, a tap, a double tap or a swipe on the second interactive element. Preferably, the first interaction may be a swiping on a handle of the first interactive element according to an implementation form.

According to an eleventh implementation of the apparatus according to the first aspect, the apparatus further comprises a renderer configured to render the user interface. The renderer may be or include a graphics render configured to render the user interface including the first and second interactive elements on a display. Additionally, or as an alternative, the renderer may be or include a renderer of any other modality, such as an acoustic renderer or a haptic renderer configured to provide representations of the interactive elements in the respective modality.

According to an twelfth implementation of the apparatus according to the first aspect, the function determined by the second interactive element defines additional functionality related to the first interactive element. The first interactive element may be directed at one or more functions, such as a first group of functions, and the second interactive element can define more detailed functions or extended functions related to the one or more functions. This has the advantage of focusing the foreground of the user interface to essential or basic functionality and enabling the user to quickly access and activate more detailed or extended functionality as defined by the second interactive element in the background.

According to a thirteenth implementation form of the apparatus according to the first aspect, the processor is further configured to automatically restore the first interactive element to the foreground in response to a discontinuation of an interaction with the first interactive element, such as with a handle of the first interactive element according to an implementation form. This has the advantage of increasing the usability of the user interface, since the user may directly discontinue or interrupt interaction with the first interactive element thereby restoring the foreground of the user interface.

In yet another fourteenth possible implementation form of the apparatus according to the first aspect, the processor is further configured to return to an initial state of the user interface after triggering the function determined by the second interactive element, in response to a discontinuation of the first interaction. This has the advantage that the user may continue to control the triggering of the function by continuing the interaction with the first interactive element. For example, as long as the user interacts with the first interactive element, the second interactive element may be altered during execution of the function to display or otherwise provide information on the execution of the function, such as providing a current state of execution of the function and related system information.

In a fifteenth possible implementation form of the apparatus according to the first aspect, said returning may be performed continuously and the processor may further be configured to interrupt such returning in response to a further indication of an interaction with the first interactive element. This has the advantage that the user is provided with additional time to correct user input.

In a preferred implementation form the user interface is a three-dimensional user interface.

According to a second aspect, a user equipment is provided which comprises an apparatus according to one implementation form. In particular, the user equipment may comprise an apparatus including a display configured to provide a user interface, and a processor configured to provide a first interactive element in a foreground of the user interface, provide at least a second interactive element, the second interactive element being arranged in a background of the user interface, receive an indication of an interaction of a user with the second interactive element in the background, and trigger a function determined by the second interactive element based on the indication of the interaction with the second interactive element. It is to be understood that the user equipment according to the second aspect may include any combination of features of an apparatus according to one or more implementation forms of the first aspect.

In a first possible implementation of the user equipment according to the second aspect, the user equipment is one of a mobile device, such as a portable computing device, a laptop or a tablet device; a communication device, such as a mobile phone or a smartphone; or an electronic device, such as a set-top box, a media player or other home entertainment device or electronic gadget.

In a third aspect, a method for operating a user interface is provided comprising the steps of providing at least a first interactive element in a foreground of the user interface, providing at least a second interactive element, the second interactive element being arranged in a background of the user interface, receiving an indication of an interaction of a user with the second interactive element in the background, and triggering a function determined by the second interactive element based on the indication of the interaction with the second interactive element. The method provides for an efficient and intuitive interaction with a user interface having an extended functionality by enabling a direct interaction with interactive elements in the background of the user interface.

In a first possible implementation of the method according to the third aspect, said triggering of the function is performed in response to a completion of the interaction with the second interactive element.

In a second possible implementation of the method according to the third aspect, the method further comprises moving or rotating the first interactive element at least partially out of the foreground in response to an interaction of the user with a handle, such that the second interactive element becomes at least partially perceivable.

In a third possible implementation of the method according to the third aspect, the method further comprises activating the second interactive element in response to an interaction of the user with a handle of the first interactive element.

In a fourth possible implementation of the method according to the third aspect, the method further comprises rotating the geometric object responsive to an interaction of the user with a first surface of a geometric object such that a second surface of the geometric object becomes at least partially perceivable.

In further possible implementation forms of the method according to the third aspect, the method may comprise steps directed at functionality of one or more implementation forms of the apparatus according to the first aspect or the user equipment according to the second aspect in any combination.

According to a fourth aspect, a computer program with a program code for performing a method according to one implementation form of the third aspect is provided, wherein the method is performed when the computer program runs on a computer.

According to a fifth aspect, a computer program product is provided, which comprises a readable storage medium storing program code thereon for use by a user equipment, the program code comprising instructions for performing individual method steps according to possible implementation forms of the method according to the third aspect.

According to yet another sixth aspect, a data structure of a user interface is provided, wherein the data structure comprises a plurality of interactive elements including a first and second interactive element, wherein based on the data structure the user interface is provided such that at least a first interactive element is provided in a foreground of the user interface and at least a second interactive element is arranged in a background of the user interface. For each interactive element, the data structure defines one or more functions, wherein the one or more functions of the second interactive element are triggered in response to an indication of an interaction of a user with the second interactive element.

Implementation forms of the invention can thus provide an efficient and intuitive way of interacting with user interfaces, which enables a larger set of functionality and provides for faster interaction with extended functions.

BRIEF DESCRIPTION OF THE DRAWINGS

The specific features, aspects and advantages of the present disclosure will be better understood with regard to the following description and accompanying drawings.

DETAILED DESCRIPTION

Figure 1:
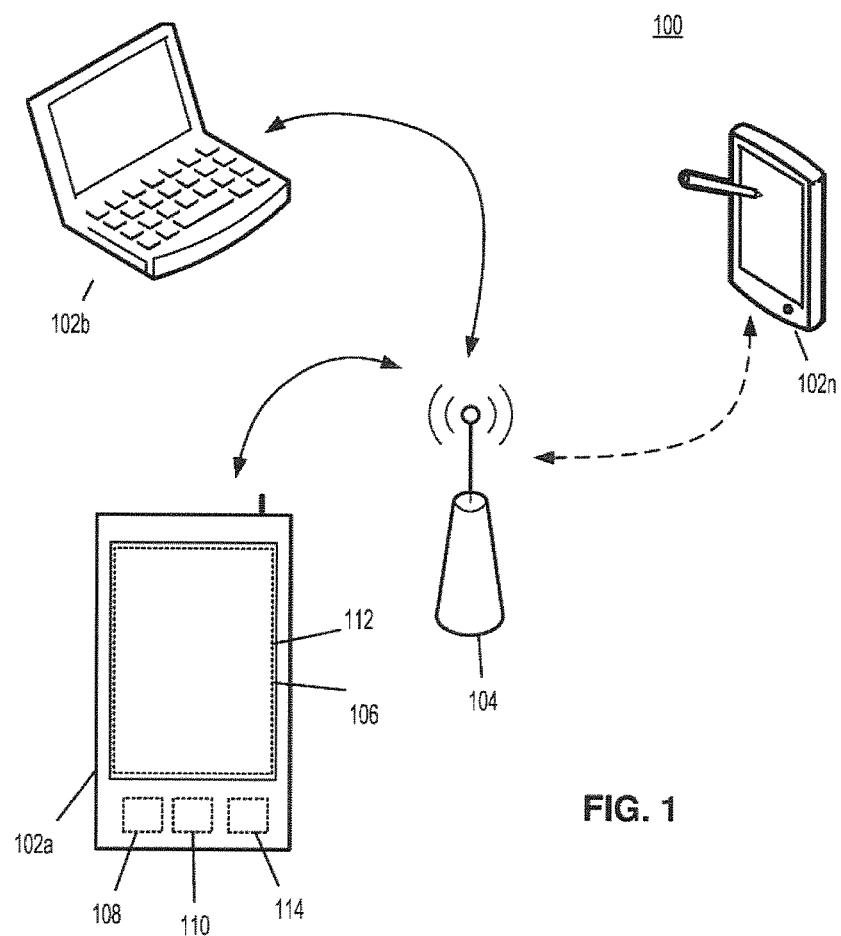
FIG. 1 is a high level system diagram including a plurality of apparatuses in accordance with one or more embodiments of the invention.

FIG. 1 shows a high level system diagram including a plurality of apparatuses according to one or more embodiments of the present disclosure. In the system 100, apparatuses 102a, 102b may be connected to a network (not shown) using an access point 104 in order to send and receive data via the network. As shown by the dotted line between apparatus 102n and the access point 104, the connection can be optional or temporal. Hence, stand-alone and off-line electronic devices, such as eBook readers and other electronic devices which do not require a connection to a network, are also fully encompassed by embodiments of the present disclosure.

Apparatus 102a may comprise one or more of a display 106, a processor 108 and memory 110. The memory 110 may store program code which may be read by and executed on the processor 108 in order to configure the apparatus 102a to perform operations defined by the program code. For example, the processor 108 may be configured to perform a method for operating a user interface. The processor 108 may process the program code or associated data, which may also be stored in the memory 110, and may generate an output including the user interface to be rendered on the display 106. The user interface may comprise one or more interactive elements (not shown), wherein each interactive element may be provided at least partially in a foreground or a background of the user interface. For example, the user interface may be a three-dimensional graphical user interface and the processor 108 may provide the output to a rendering engine (not shown) to render a three-dimensional representation of the interactive elements on the display 106.

The apparatus 102a may further comprise one or more input sensors 112, 114, wherein the input sensors 112, 114 may be configured to provide input generated by a user to the processor 108. The processor 108 may analyze the user input in order to identify interactive elements of the user interface affected by the user input and perform functions associated with the identified interactive elements. For example, the processor 108 may execute a functional component or an engine defining the behavior of the user interface and provide the user input to the functional component or engine of the user interface to identify the interactive elements and perform respective functions.

The input sensor 112 may be a touch sensor, which may be arranged on top of or combined with the display 106. The input sensor 112 may be capable of detecting a direct contact of a finger of the user or a stylus operated by the user. Based on the position of the contact on the user interface 112 or a respective history of the interaction, such as a gesture, the processor 108 may identify the corresponding interactive element in relation to the current position of the contact and may execute the functionality associated with the identified interactive element, which may take the current position or the history of the interaction into account. For example, the user may touch an interactive element and swipe or move the interactive element into a direction. By removing the finger, the interaction can be completed and the interactive element may be dropped on the last position. This interaction may trigger further functionality as defined by the associated interactive element, the user interface or its processing component or engine.

The input sensor 114 may be an acoustic input sensor, such as a microphone, which may detect a voice command that may include an indication of a desired interactive element. For example, the user may identify a desired interactive element using a label or any other suitable identification and may also express a desired action to be performed in relation to the desired interactive element. The processor 108 may recognize the voice command and submit the data characterizing the interaction to the user interface or its processing component or engine.

Even though the apparatus 102a has been shown with several components, including the display 106 and two input sensors 112, 114, it is to be understood that each of the apparatuses 102b, . . . , 102n may include the same or similar components in any combination. It is to be understood that the apparatuses 102a, 102n may include other output devices for the same or other modalities, such as loudspeakers or a vibrotactile feedback layer, or may include other input sensors, such as a keyboard, a camera, a depth sensor, as well as interfaces which may be capable of connecting to external input devices.

Figure 2:
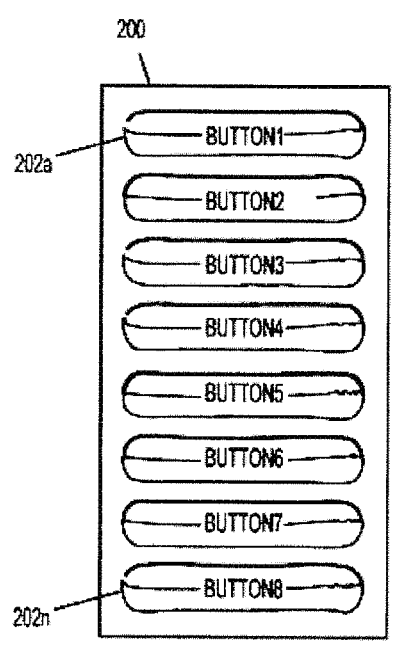
FIG. 2 illustrates an interactive element according to an embodiment of the invention.
Figure 3:
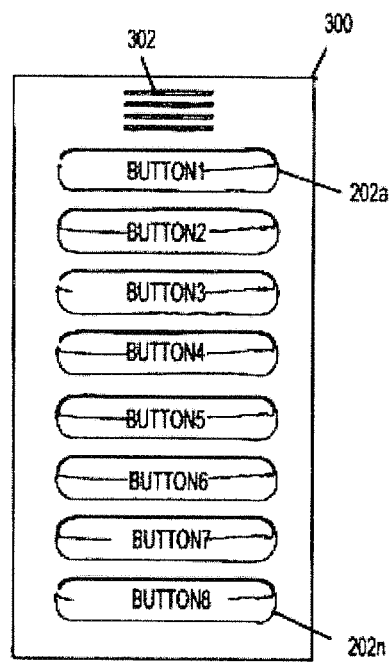
FIG. 3 illustrates a further interactive element according to an embodiment of the present invention.

FIGS. 2 and 3 show exemplifying representations of interactive elements as used in user interfaces according to embodiments of the present disclosure. The interactive elements 200, 300 may include a list of buttons 202a, 202n, which may each define a certain functionality of the interactive element 200, 300 and may be labeled using text or icon identifying or characterizing the underlying function, such as exemplifying labels "BUTTON1", . . . , "BUTTON8" or any other suitable label, such as "save", "load", etc. for a file related interactive element.

The interactive element 300 may further comprise a handle 302 which may be arranged on a periphery or in the center of the interactive element 300. The handle 302 may be, for example, a handle element or any other designated area of the interactive element. The handle 302 may trigger general functionality of the user interface that may affect the behavior of the interactive element 300. For example, the handle 302 may be used to move and/or rotate, collapse, discard, activate, refresh the interactive element 300 or affect the interactive element 300 in any other suitable way.

Even though the interactive elements 200 and 300 shown in FIG. 2 and FIG. 3, respectively, have been shown as including multiple buttons 202a, . . . , 202n, the individual buttons 202a, 202n can define individual interactive elements of the user interface. Accordingly, the user interface may allow for a composition of interactive elements out of a set of further interactive elements in a hierarchical and nested way.

Figure 4:
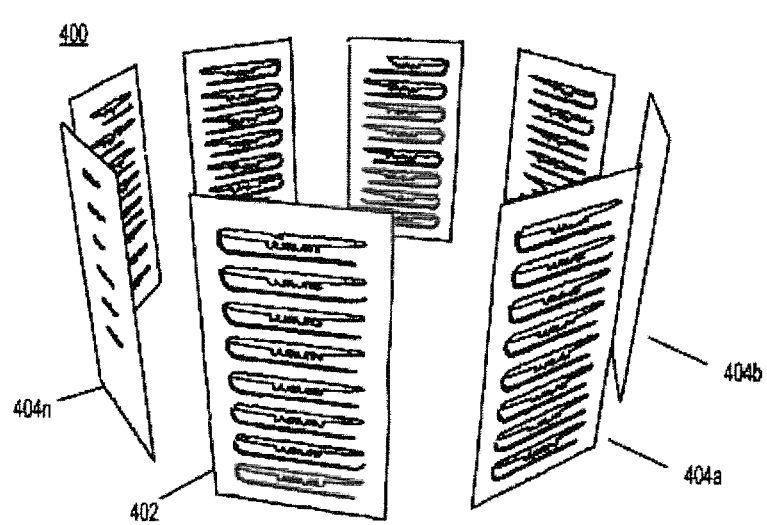
FIG. 4 shows a user interface according to an embodiment of the present invention.

FIG. 4 illustrates a three-dimensional user interface according to an embodiment of the present disclosure. The user interface 400 may comprise an interactive element 402 in a foreground of the user interface 400 and a plurality of interactive elements 404a, 404b, . . . , 404n which may be arranged in a background of the user interface 400. Each of the interactive elements 402, 404a, . . . , 404n may be, for example, one of the interactive elements 200, 300 as shown in FIGS. 2 and 3. The current interactive element in the foreground, such as the interactive element 402, may be dynamically configured to comprise a handle in order to simplify interaction with the interactive element 402. The handle (not shown) may be automatically removed as soon as the interactive element 402 is moved to the background. The handle or a rotation handle can be arranged on top of the interactive element 402 such as in a headline or in any other designated area, which may trigger a behavior of the interactive element 402 or general behavior of the user interface 400. For example, the interactive element 402 may include the handle 302 of the interactive element 300 as shown in FIG. 3.

The interactive elements 402, 404a, . . . , 404n may be represented as three-dimensional or two-dimensional objects arranged in a three-dimensional environment, such as arranged in a circle or cylindrically or fan-shaped around a center. However, it is to be understood that the interactive elements 402, 404a, . . . , 404n can be arranged in any other suitable way in the three-dimensional environment.

The foreground of the three-dimensional user interface 400 and the interactive element 402 may represent an active context or user space, which may be prioritized over the background of the user interface 400 and the interactive elements 404a, . . . , 404n. Hence, the user may directly interact with the first interactive element 402 in the foreground of the user interface 400. However, the user may also directly access the other interactive elements 404a, . . . , 404n in the background of the user interface 400. Hence, the interactive elements 402, 404a, . . . , 404n can be activated regardless of being in the foreground or in the background. Accordingly, the user interface 400 meets the expectations of the user that if something appears as an interactive element it should be an interactive element.

The user can manipulate the user interface 400 and the interactive elements 402, 404a, . . . , 404n with a set of gestures, which may allow the user to quickly access an extended functionality more conveniently than in a conventional two-dimensional or three-dimensional user interfaces. A user may, for example, rotate all or at least some interactive elements 402, 404a, . . . , 404n by interacting with the first interactive element 402, for example by tapping the interactive element 402 or a respective handle (not shown) of the interactive element 402 and holding and sliding their finger on a display.

The handle can be used to rotate the interactive element 402 in order to receive additional information provided by the interactive elements 404a, . . . , 404n of the user interface 400. This information may already have been perceivable when the first interactive element 402 was entirely in the foreground and the additional information may become better visible, such as moving the second interactive element 404a or 404n at least partially into the foreground of the user interface and moving the interactive element 402 at least partially out of the foreground of the user interface.

Figure 5A:
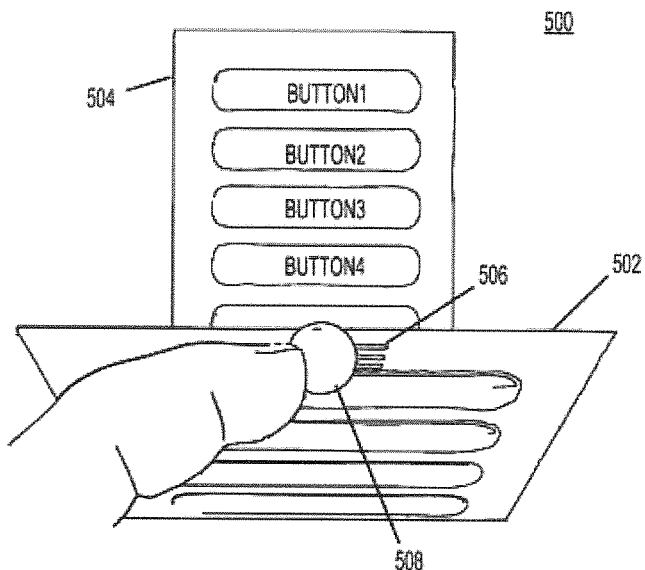
FIGS. 5a and 5b depict interaction with a user interface according to an embodiment of the present invention.
Figure 5B:
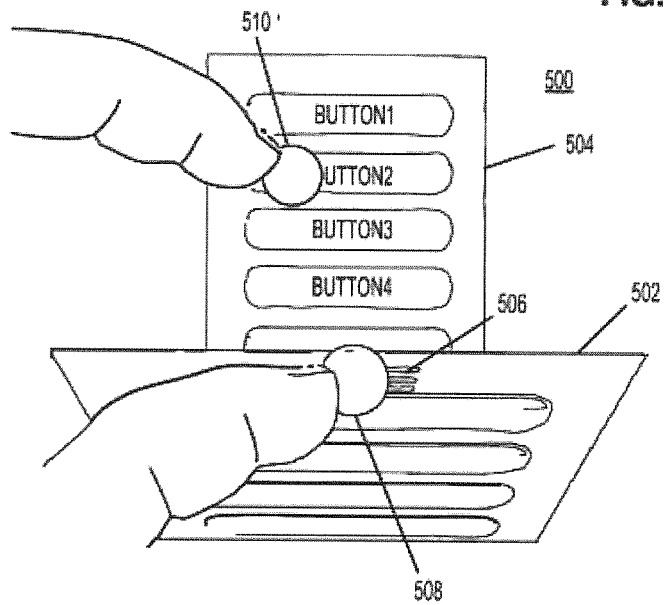

FIGS. 5a and 5b show a sequence of an interaction with a user interface according to one or more embodiments of the present disclosure. The user interface 500 may include a first interactive element 502 and a second interactive element 504 which may be arranged in a fan-shaped manner behind the first interactive element 502. The first interactive element 502 may be provided in a foreground of the user interface 500 and the second interactive element 504 may be provided in a background of the user interface 500. The first and second interactive elements 502, 504 may correspond to the interactive elements as shown in FIGS. 2 to 4 and may have a similar or a different set-up and configuration of the underlying interactive elements. The first and second interactive elements 502, 504 may be arranged on surfaces of three-dimensional objects, which can be a flat plane, a panel or any suitable three-dimensional object rendered in the three-dimensional environment of the user interface 500. However, the present disclosure is not limited to a particular layout of an interactive element or an arrangement or set-up of individual buttons and other interactive elements within the interactive elements 502, 504.

As shown in FIG. 5a, a user may operate a touch-sensitive display, such as the display 106 and input sensor 112 of the apparatus 102a in FIG. 1, and may use a finger to interact with a handle 506 of the first interactive element 502. The user interface 500 may confirm the interaction with the handle 506 of the first interactive element 502 by displaying a sphere 508 or any other suitable confirmation, which may be locked to a current position of the handle 506 and which may also change its appearance, such as a color or any other property, in order to show a status of the interaction. It is to be understood that the confirmation needs not be a visual confirmation and that a corresponding vibrotactile feedback or any other feedback in any other modality may be provided to the user in case of a successful interaction with the first interactive element 502.

Initially, the interactive element 502 may have completely covered the second interactive element 504 or the first interactive element 502 may have at least partially covered the second interactive element 504. By interacting with the handle 506 of the first interactive element 502, the first interactive element 502 may be rotated towards the user, thereby revealing more details of the second interactive element 504 behind the first interactive element 502.

As shown in FIG. 5b, the user may use a second finger to interact with the second interactive element 504 shortly after and/or simultaneously with the interaction with the handle 506 of the first interactive element 502 using the first finger. For example, the user may select one of the buttons of the second interactive element 504 using the second finger. Accordingly, the functionality provided by the second interactive element 504 can be interacted with the second finger while the first finger is being held in place. The interaction can be discontinued by releasing one of the fingers prior to execution of the function. Hence, the user may decide when the right action has been selected by releasing the first or second finger. The gestures for activating a function with the second finger may include a tap, double tap, swipe and any other appropriate gesture. Furthermore, the user interface may support hovering over individual interactive elements both in the foreground and in the background of the user interface 500 in order to trigger a respective functionality.

Similar to the confirmation of the interaction with the handle 506 of the first interactive element 502 using sphere 508, the interaction with the second finger can be confirmed using a further sphere 510 or any other confirmation approach as discussed with regard to sphere 508.

As soon as the desired function represented by the second interactive element 504 is activated, the user can return to the previous state of the user interface 500 by releasing both fingers from the surface of the screen. The first interactive element 502, which was dragged down may tilt back to the original state and the desired and selected functionality may be executed.

The interaction with the user interface 500 may be performed using two fingers of one hand, which may be particularly beneficial on touch-based mobile devices which typically allow for a quick interaction with one hand. Similarly, the interaction with the second interactive element 504 may also be achieved using a voice command or any other modality in order to access and trigger the extended functionality provided by the second interactive element 504. Hence, implementation forms of the present invention provide for a more fluent interaction model which may be, in particular, applied in mobile devices. Furthermore, more interactive content may be available for the user and interactive content may be more efficiently created.

Figure 6:
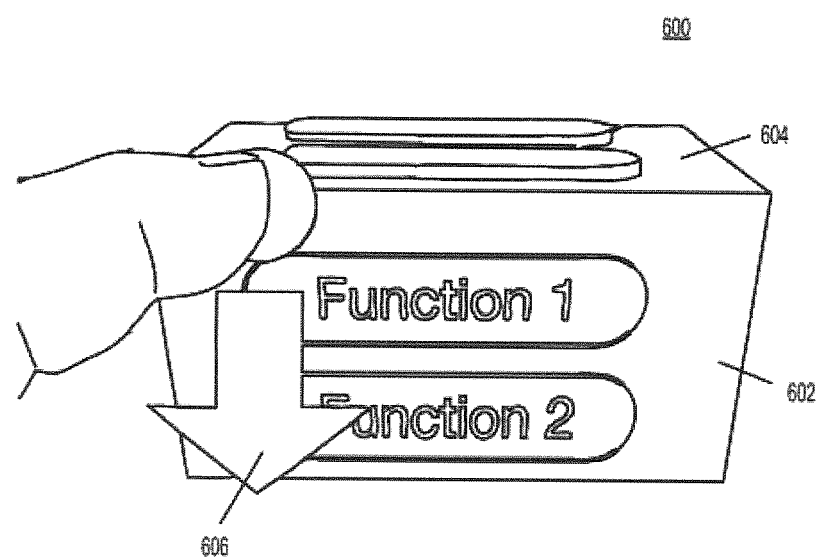
FIG. 6 shows another user interface according to one or more embodiments of the present invention.

FIG. 6 shows another user interface and interaction according to an embodiment of the present disclosure. The user interface 600 may be a three-dimensional graphical user interface and may include a first interactive element 602 and a second interactive element 604, which may be arranged on adjacent surfaces of a geometric object. Similar to the interaction with the first interactive element 502 in FIGS. 5a and 5b, the user may hold and slide the first interactive element 602 downwards, which may be confirmed or indicated by an arrow 606. The arrow 606 or a corresponding sphere may be overlaid on the user interface 606 and/or may be provided to the user as a confirmation in any other modality as, for example, discussed with regard to the continuation spheres 508, 510 in FIGS. 5a and 5b. The rotation of the three-dimensional object may expose the second interactive element 604, which may enable further functionality. The user may, for example, interact with the second interactive element 604 by using a second finger, by providing a voice command or using any other interaction technique.

Figure 7:
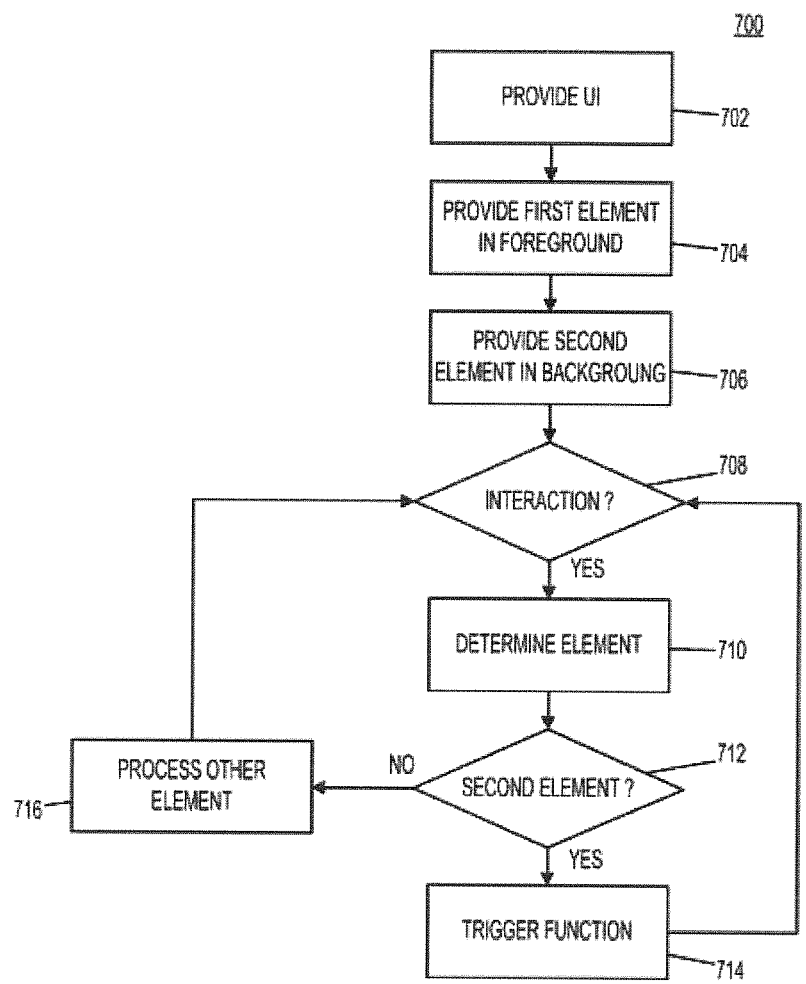
FIG. 7 is a flowchart of a method for operating a user interface according to one or more embodiments of the present invention.

FIG. 7 is a flowchart of a method according to one embodiment of the present disclosure. The method 700 may be a method for operating a user interface. The method 700 may start in step 702 by providing a user interface on an output device of an apparatus, such as on a display of an electronic device. The method may continue in steps 704 and 706, wherein a first element is provided in a foreground of the user interface and a second element is provided or arranged in a background of the user interface, respectively. Initially, the first element in the foreground may overlay at least partially any elements arranged in the background. Also, in the initial state the elements in the background may be at least partially visible. The first and second elements may be interactive elements according to embodiments of the present disclosure.

The method 700 may continue in step 708 in order to determine, whether an interaction by a user has taken place. If an interaction has been detected in step 708, the method 700 may continue with step 710, wherein an element of the user interface is determined, which has been affected by the interaction. If an interaction of the user with the second element in the background has been detected in step 712, an indication of the interaction may be generated and further provided to the user interface. In step 714 a function determined by the second element may be triggered based on the indication of the interaction with the second element.

In case the interaction was directed at another element, the method 700 may process the functionality of the other element in step 716. The method 700 may proceed with step 708 and continue monitoring interactions with the user interface.

The method 700 may be performed by an engine of the user interface, which may perform the individual steps and which may also maintain a state of the interactions and the affected elements. The user interface or the engine of the user interface may determine the affected elements in step 710 by using a prioritized approach, which enables an interaction with both, elements in the foreground and elements in the background. The method 700 may first consider elements in the foreground in order to determine the affected element and if no affected element in the foreground is found, may consider the further elements in the background in order to determine the element affected by the interaction. Furthermore, the method 700 may also process multiple interactions, which may at least partially be performed simultaneously and which may be used to prioritize the handling of elements in the background. For example, a first interaction may be directed at the first element located in the foreground and a second interaction may be directed at the second element in the background. If the first and second interactions have been performed simultaneously, the method 700 may prioritize the second element during step 710. For example, the method 700 may consider the elements in the foreground in combination with the second element in the background during step 710 prior to a consideration of the further elements in the background. Hence, the first interaction with the first element may activate or prioritize the handling of the second element.

Although the present invention and its advantages have been described in detail, it should be understood that various changes, substitutions and alternations can be made herein without departing from the spirit and scope of the invention as defined by the appended claims.

What is claimed is:

1. An apparatus comprising:
a display configured to provide a three-dimensional user interface; and
a processor configured to provide:
at least a first interactive element in a foreground of the three-dimensional user interface wherein the first interactive element includes a handle,
provide at least a second interactive element, the second interactive element being arranged in a background of the three-dimensional user interface and displayed at least partially behind and hidden by the first interactive element,
receive an indication of a first interaction of a user with the first interactive element in the foreground and, simultaneously or during the first interaction, a second interaction of the user with the second interactive element in the background while the second interactive element is displayed at least partially behind and hidden by the first interactive element, and
trigger a function determined by the second interactive element based on the indication of the interaction with the second interactive element,
wherein the processor is further configured to move or rotate the first interactive element at least partially out of the foreground in response to an interaction of the user with the handle, such that the second interactive element becomes at least partially perceivable, and automatically remove the handle of the first interactive element if the first interactive element is moved to the background, and display a second handle of the second interactive element if the second interactive element is moved to the foreground,
wherein the interaction of the user with the handle includes dragging that moves or rotates the first interactive element along with a finger or cursor.

2. The apparatus according to claim 1, wherein the function is triggered in response to a completion of the second interaction with the second interactive element.

3. The apparatus according to claim 2, wherein the foreground of the user interface is an active context of the three-dimensional user interface and the background of the three-dimensional user interface defines a further context of the user interface.

4. The apparatus according to claim 1, wherein the processor is configured to activate the second interactive element in response to an interaction of the user with the second handle.

5. The apparatus according to claim 1, wherein the first interactive element is arranged on a first surface of a geometric object in the foreground of the three-dimensional user interface and the second interactive element is arranged on a second surface of the geometric object in the background.

6. The apparatus according to claim 5, wherein the processor is configured to rotate the geometric object responsive to an interaction of a user with the first surface such that the second surface becomes at least partially perceivable.

7. The apparatus according to claim 1, further comprising:
an acoustic sensor configured to detect a voice command representing the interaction with the second interactive element.

8. The apparatus according to claim 1, wherein the function determined by the second interactive element defines additional functionality related to the first interactive element.

9. A user equipment comprising:
an apparatus, comprising:
a display configured to provide a three-dimensional user interface; and
a processor configured to:
provide at least a first interactive element in a foreground of the three-dimensional user interface wherein the first interactive element includes a handle,
provide at least a second interactive element, the second interactive element being arranged in a background of the three-dimensional user interface and is displayed at least partially behind and hidden by the first interactive element, receive an indication of a first interaction of a user with the first interactive element in the foreground and, simultaneously or during the first interaction, a second interaction of the user with the second interactive element in the background while the second interactive element is displayed at least partially behind and hidden by the first interactive element, and trigger a function determined by the second interactive element based on the indication of the interaction with the second interactive element, wherein the processor is further configured to move or rotate the first interactive element at least partially out of the foreground in response to an interaction of the user with the handle, such that the second interactive element becomes at least partially perceivable, and automatically remove the handle of the first interactive element if the first interactive element is moved to the background, and display a second handle of the second interactive element if the second interactive element is moved to the foreground, wherein the interaction of the user with the handle includes dragging that moves or rotates the first interactive element along with a finger or cursor.

10. A method for operating a user interface, the method comprising:

providing at least a first interactive element in a foreground of the three-dimensional user interface wherein the first interactive element includes a handle;

providing at least a second interactive element, the second interactive element being arranged in a background of the three-dimensional user interface and displayed at least partially behind and hidden by the first interactive element;

receiving an indication of a first interaction of a user with the first interactive element in the foreground and, simultaneously or during the first interaction, a second interaction of the user with the second interactive element in the background while the second interactive element is displayed at least partially behind and hidden by the first interactive element; and triggering a function determined by the second interactive element based on the indication of the interaction with the second interactive element;

wherein if the first interactive element is moved or rotated at least partially out of the foreground in response to an interaction of the user with the handle, such that the second interactive element becomes at least partially perceivable, the handle of the first interactive element is automatically removed if the first interactive element is moved to the background, and a second handle of the second interactive element is automatically displayed if the second interactive element is moved to the foreground;

wherein the interaction of the user with the handle includes dragging that moves or rotates the first interactive element along with a finger or cursor.

* * * * *